Aug. 20, 1935. E. A. McKILLOP Re. 19,673

DEVICE FOR CLEANING BOBBINS

Original Filed Nov. 5, 1931 2 Sheets-Sheet 1

WITNESS
Lawrence O. Mankin

INVENTOR
E. A. McKillop,
BY
Munn & Co.
ATTORNEY

Aug. 20, 1935. E. A. McKILLOP Re. 19,673

DEVICE FOR CLEANING BOBBINS

Original Filed Nov. 5, 1931 2 Sheets-Sheet 2

WITNESS

Lawrence O. Mankin

INVENTOR

E. A. McKillop,

BY

Munn & Co.

ATTORNEY

Reissued Aug. 20, 1935 Re. 19,673

UNITED STATES PATENT OFFICE 19,673

DEVICE FOR CLEANING BOBBINS

Edgar A. McKillop, Hendersonville, N. C.

Original No. 1,945,654, dated February 6, 1934, Serial No. 573,273, November 5, 1931. Application for reissue April 8, 1935, Serial No. 15,352

6 Claims. (Cl. 28—20)

Figure 1:
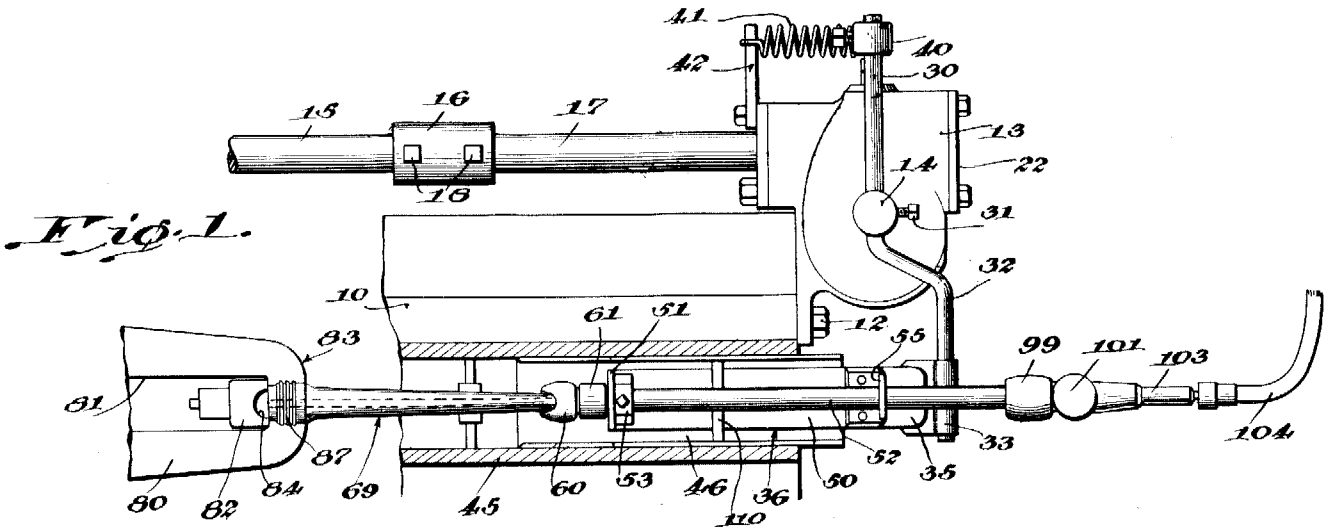

This invention relates to a device for cleaning the central passages in bobbins. Machines which are known as bobbin strippers place the bobbins periodically in predetermined position and weft residues which collect upon the exterior of the quill or bobbin is scraped or stripped off and are defined in the art as bobbin or quill stripping machines. In these types of machines the bobbin head is gripped between a pair of automatically operated jaws carried by a cross head which is reciprocated to cause the quills or bobbins to be moved between knives which strip the weft windings or weft residues from the exterior of the quills or bobbins. The clean bobbins are then removed and are ready for use. These machines automatically place the quills in the cleaning position and also remove them periodically from such position. The axial passages of the bobbin, however, are cleaned manually by means of tools or wires which are passed through the central core.

An object of the invention is the provision of a device for automatically cleaning the axial passages of quills or bobbins by forcing compressed air through the passages with the quills being placed in operative position for the axial cleaning and then removed to permit successive quills to be placed in position to receive a blast of compressed air.

Another object of the invention is the provision of a device for forcing compressed air through the axial passage of a quill or bobbin for removing lint collected therein in which a nozzle is moved into snug contact with the smaller end of the quill and in alignment with the axial passage so that when the carrier carrying the nozzle is reciprocated and the nozzle is in contact with the quill a valve will be automatically operated for forcing a blast of compressed air through the nozzle and through the axial passage of the quill.

A further object of the invention is the provision of a device for cleaning the axial passages of the quills or bobbins in which a nozzle is moved into contacting relation with one end of the quill, the nozzle being carried by a carriage which is periodically reciprocated towards and away from the quill while the quill is held temporarily in a fixed position for the cleaning operation.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
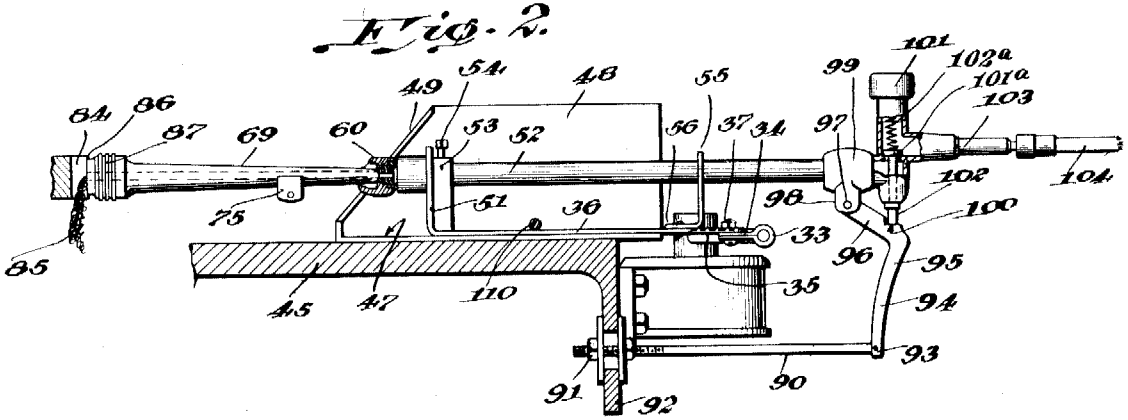
Figure 3:
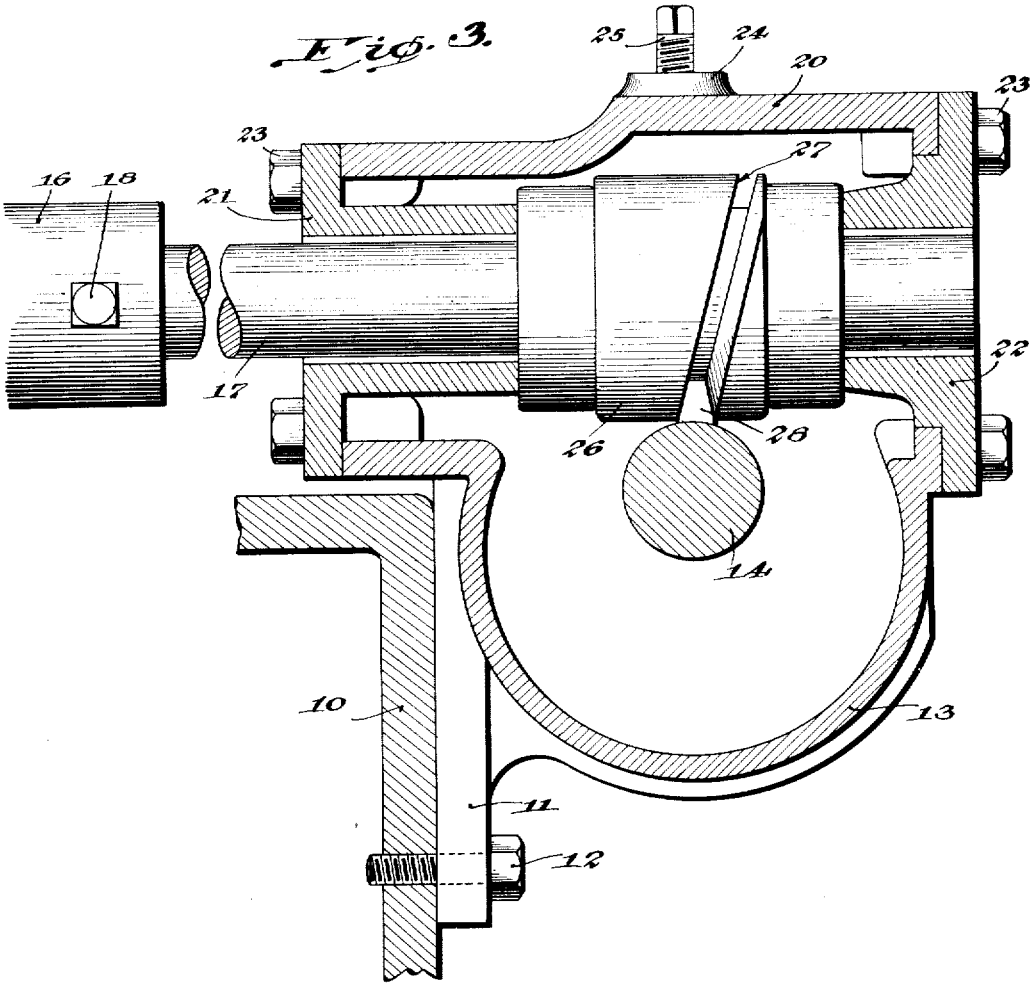
Figure 4:
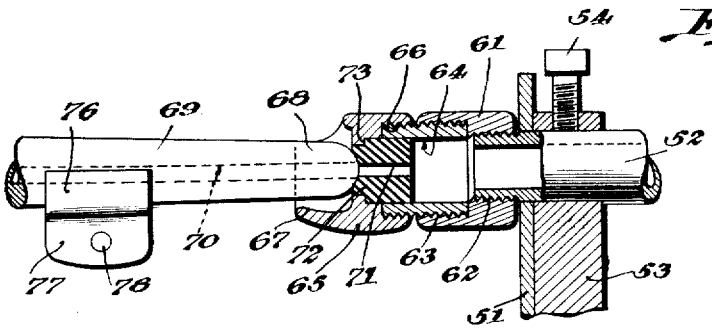

In the drawings:

Figure 1 is a plan view partly in section of a device constructed in accordance with the principles of my invention, Figure 2 is a side elevation of the device with parts in section, Figure 3 is a vertical section of the oscillating means for the movable carriage, and Figure 4 is an enlarged section of the air nozzle.

Referring more particularly to the drawings, 10 designates a bracket to which is secured an arm 11 by means of screws 12. This arm is formed integrally with a casing 13 which provides a housing for a rock shaft 14. The bracket 10 forms part of an Utsman bobbin stripper disclosed in Patent No. 1,740,127, dated Dec. 17, 1929, or other similar machine which is adapted to clean the exterior walls of the quills or bobbins, the last-named device containing means for automatically positioning the quills or bobbins for cleaning purposes but since this stripper forms no part of the present invention, the same is not shown completely.

An operating shaft of the stripper indicated at 15 and a coupling sleeve 16 connects the shaft 15 with a shaft 17, set screws 18 being employed for connecting the sleeve 16 to the respective shafts. The shaft 15 is rocked through an angle of approximately 10° to 15° as is likewise the shaft 17 for a purpose which will be presently explained.

The housing 13 has an upper extension 20 with its opposite ends open to receive bearings 21 and 22 which are secured in place by means of bolts 23.

A boss 24 is formed on the top of the extension 20 of the casing 13 and is provided with a threaded passage receiving a plug 25. The passage in which the plug 25 is threaded provides means for the application of a lubricant to the working parts within the casing 13.

The shaft 17 is provided with an enlarged portion 26 having a spiral groove 27 which receives a tooth 28 formed radially on the shaft 14.

A bar 30 passes through an opening in the shaft 14 and is secured in place on said shaft by means of a set screw 31. The shaft has an offset portion 32 which is received within a sleeve 33 having ears 34 which are secured to the outer end 35 of a slidably mounted carriage 36 by means of bolts 37. The opposite end of the bar 30 is provided with a sleeve 40 to which is connected one end of a coil spring 41. The other end of the coil spring is secured to a rod 42 which in turn is attached to one end of the casing 13. The spring 41 is adapted to maintain the bar 30 in a predetermined position which is substantially at right angles to the shaft 17.

The bracket 10 of the bobbin stripper referred to above is provided with a channel member 45 in which is mounted a housing 46. This housing includes a base member 47 and side walls 48. The side walls of the housing are sheared off, as shown at 49, at an angle to the vertical and this housing receives the carriage 36.

The carriage consists of a base member 50 having a vertically disposed end member 51 formed integrally with the base member and provided with an opening to receive a pipe 52. A block 53 which is secured to the member 51 is also provided with an opening to receive the pipe 52. A set screw 54 secures the pipe to said block. A support 55 has a foot 56 which is secured to the base member of the carriage 36. This member 55 is provided with an opening which receives the pipe 52 so that the block 53 and members 51 and 55 support the pipe 52 upon the carriage 36.

A nozzle, generally designated by the numeral 60, is secured to the end of the pipe 52 which projects beyond the member 51. The nozzle consists of a sleeve 61 threaded at 62 upon the outer end of the pipe 52. This sleeve has a countersunk portion which is threaded as shown at 63 to receive an internal sleeve 64. A head 65 is threaded at 66 upon the internal sleeve 64 for securing the head 65 to the sleeve 61 and likewise to the pipe 52.

The head 65 is provided with a lip portion 67 projecting outwardly from the head 65 at the lower end to receive the reduced end 68 of a quill or bobbin 69. This construction permits the quills to be placed in contact with the nozzle so that the axial passage 70 of the quill 69 will be aligned with an axial passage 71 in a rubber sleeve 72. This sleeve is forced into the sleeve 64 and is provided with a shoulder 73 engaging a complementarily-constructed shoulder formed interiorly of the head 65.

A supporting member for the quill 69 is shown at 75 and this member consists of similarly constructed members and similarly constructed plates 76 which has a lower inner offset portion 77 perforated to receive a bar 78. The bar 78 is received by the side walls of the chute or channel member 45. The upper ends of the plates 76 are spaced apart sufficiently to snugly receive an intermediate portion of a quill 69.

A support for the quill or bobbin head in the stripping machine is in the form of a reciprocating cross head having a pair of movable arms 80 and 81 having clamping jaws 83 which are adapted to automatically grip the quill or bobbin head 87, as the quills are moved into position. The cross head carrying the arms 80 and 81 is adapted to be reciprocated towards the nozzle 60 by a moving part (not shown) of the stripping machine.

A head abutment 82 is carried by the cross head between the outer free ends of the arms 80 and 81 and is in horizontal alignment with the nozzle 60. This head abutment is provided with a vertical passage 84 which is in open communication with the central passage 70 of the quill 69 to permit lint, as shown at 85, to pass downwardly after said lint has been blown from the axial passage of the quill. The outer free end of the abutment 82, as shown at 86, is adapted to snugly engage the head 87 of the quill and is maintained in such position by the clamping arms 80 and 81.

A rod 90 is secured at 91 to a bracket arm 92 depending from the channel member 45. At the outer end of the arm, as shown at 93, is pivotally mounted one end of a lever 94 which is bent intermediate its ends, as shown at 95, to provide an offset arm 96. This arm is pivoted at 97, upon ears 98, depending from a cuff 99. The lever 94 is provided with a seat 100 for a purpose which will be presently explained.

A valve casing, as shown at 101, is provided with a valve 101a having a depending stem 102 which is adapted to be in engagement with the seat 100 on the lever 94. A spring 102a maintains the valve closed. The casing 101 is in communication with the pipe 52 and with a pipe 103 which is connected with a flexible tubing 104. This tubing is connected with a source of compressed air.

The operation of my device is as follows: The device for cleaning the axial passages of quills or bobbins is used in connection with a stripping machine which is adapted to automatically place the quills or bobbins in a predetermined position for stripping the lint from the exterior walls of the quills or bobbins and for removing the lint after the cleaning operation has been completed. While these quills or bobbins are being held in place before the initiation of the stripping operation the nozzle 60 has time to move into snug contact with the reduced end of the tapered bobbin or quill 69 by the mechanism shown in Fig. 3 and as the carriage 36 is moved towards the reduced end of the bobbin the lever 94 is actuated so that when the rubber sleeve 72 has come into snug engagement with the end of the quill 69, the lever 94 will be tilted sufficiently to elevate the stem 102 and thereby open the value within the housing 101 so that a blast of compressed air will be forced through the axial passage 70 of the quill 69 and force the lint from the enlarged end 87 as shown at 85 in Fig. 2. The carriage is then moved in the opposite direction, releasing the quill 69 so that the mechanism (not shown) will be permitted to remove the quill and place another quill in position for the cleaning of the lint from the axial passage of said quill.

It will be seen that since the shaft 17 is rocked through a small angle by the shaft 15, the spiral groove 27, receiving the tooth 28 of the shaft 14, will cause the shaft 14 likewise to be rocked, thereby oscillating the rod 30 so that the offset portion 32 of the rod 30 will be moved outwardly and thus move the carriage 36 in the same direction and the nozzle 60 away from the reduced end of the quill 69. As the shaft 15 is rocked in the opposite direction and likewise the shaft 17, the shaft 14 will be moved in the opposite direction, thereby rocking the rod 30 so that the offset portion 32 will move the carriage inwardly to cause the nozzle 60 to engage a successive quill.

The rocking of the lever 94 is again repeated for opening the valve within the casing 101 to permit a further blast of compressed air into the newly positioned quill.

When the carriage 36 is moved in the opposite direction the arm 94 is rocked outwardly, thereby lowering the seat 100, thereby closing the valve in the casing 101.

A rod 110 is secured to the side walls 48 of the housing 46 and in close association with the bottom of the carriage 36 so that the carriage will be maintained in position within its respective housing during the reciprocating movement of the carriage. The rocking of the shaft 30 is through an arc of approximately 10° to 15° and the movement of the member 52 is not over five-sixteenths of an inch, so that while the lever 94 is pivotally connected at one end with the rod 90 and at its other end with the ears 98, of the sleeve 99, the rod 90 may be flexed slightly during the very limited travel of the member 52.

When the quill or bobbin 69 has been moved to approximately the initial position for the stripping operation the nozzle 60 will be engaged by the tip of the quill through the reciprocation of the pipe 52 so that when the outer end of the rubber sleeve 72 snugly engages the tip 68 of the quill 69, a sudden blast of air will be forced through the passage 71 of the member 72 and through the pipe 70 of the quill 69 so that by the time that the stripping mechanism is ready to move the quill, the air has been cut off and the pipe 52 moves away from the tip of the quill so that the quill is then free to be moved out to permit the positioning of another quill. It will be understood that in addition to the supporting effect afforded by the cross head carrying the gripper jaws 81, 80 and the abutment 82, the quill will be supported intermediate the aforesaid parts and the nozzle tip 60 by the usual head rest and stripper blades.

I claim:

1. A bobbin cleaner comprising an air nozzle, means for supporting a bobbin with the hollow interior of the bobbin aligned with the discharge opening of said nozzle, means for reciprocating the nozzle and for moving said nozzle temporarily into snug engagement with one end of the bobbin, a pipe connecting the nozzle with a source of air and reciprocated with the nozzle, a valve incorporated in the pipe for controlling the flow of air to the nozzle, said valve having a stem, a rod having one end secured to a fixed support, a lever having one end pivoted to the free end of the rod so that the lever may be oscillated from the free end of the rod, the other end of the lever being pivotally connected to the pipe, the lever having a projection engageable with the stem so that when the lever is oscillated in one direction by the reciprocation of the nozzle, the projection will move the valve to open position.

2. In a bobbin stripping machine having a driven means, a pair of spaced supports for the ends of the bobbin, one of the supports having an air passage adapted for alignment with the axial passage in the bobbin, means actuated by the driven means of the stripper for causing the last-mentioned support to be moved into snug engagement with the adjacent end of the bobbin so that the air passage will be aligned with the axial passage in the bobbin, means for supplying the air passage in the support with air, means for controlling the supply of air to the air passage, and means operated upon the movement of the support for causing actuation of the controlling means to supply air to the quill.

3. In a bobbin stripper having means for supporting a bobbin to be stripped of lint, an air nozzle adapted to engage one end of the supported bobbin, means for moving the nozzle into snug engagement with the end of the bobbin, said nozzle having a passage adapted to align with the axial passage in the bobbin, means for supplying the passage in the nozzle with air under pressure, means for controlling the flow of air through the nozzle, means caused to be actuated by the moving means for the nozzle for operating the controlling means for the air.

4. In a bobbin stripper having means for supporting a bobbin to be stripped of lint and a driven means for causing reciprocation of the supporting means, the combination of a nozzle in alignment with the supporting means for engaging one end of the bobbin, means for supplying compressed air to the nozzle, means actuated by the driven means of the bobbin stripper for causing the release of compressed air to the nozzle and a blast of air through the bobbin.

5. In combination with a bobbin stripping machine having a bobbin pusher actuating means, a bobbin pusher, an air nozzle mounted on said pusher and provided with a tip seat for a bobbin, said air nozzle being movable back and forth with said pusher during the usual stripping operations, and means for supplying a blast of air to said nozzle actuated by the movement of said pusher to deliver a blast of air to the nozzle at the forward end of the stroke of the pusher.

6. In combination with a bobbin stripping machine having a bobbin pusher actuating means, a bobbin pusher, an air nozzle mounted on said pusher and provided with a tip seat for a bobbin, said air nozzle being movable back and forth with said pusher during the stripping operation, means for supplying air to the nozzle and including an air supply pipe connected to the nozzle, a valve in the pipe and valve actuating appliance attached to the pipe and provided with means for opening said valve when the pusher has reached approximately the end of the pushing stroke.

EDGAR A. McKILLOP.